C. Russell and W. K. Miller,
Harvester.
No 75,797. Patented Mar. 24, 1868.
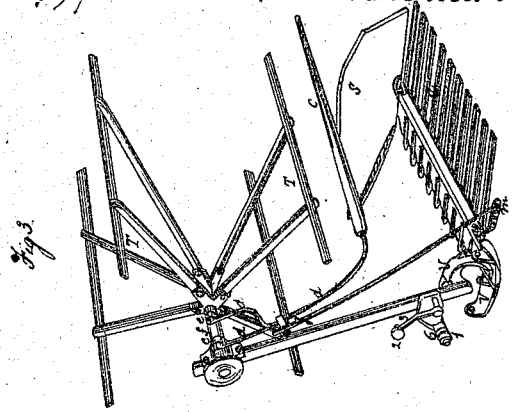
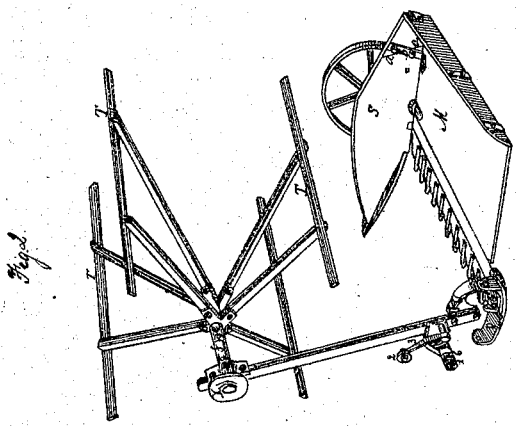
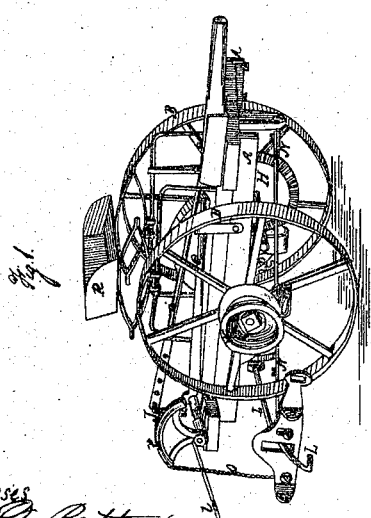
Witnesses
Jno. D. Patten
S. Moore Poole
Inventors.
Clement Russell & William K. Miller.
By their Attorney A. B. Stoughton.

C. Russell and W. K. Miller.
Harvester.
No 75,797. Patented Mar. 24. 1868.
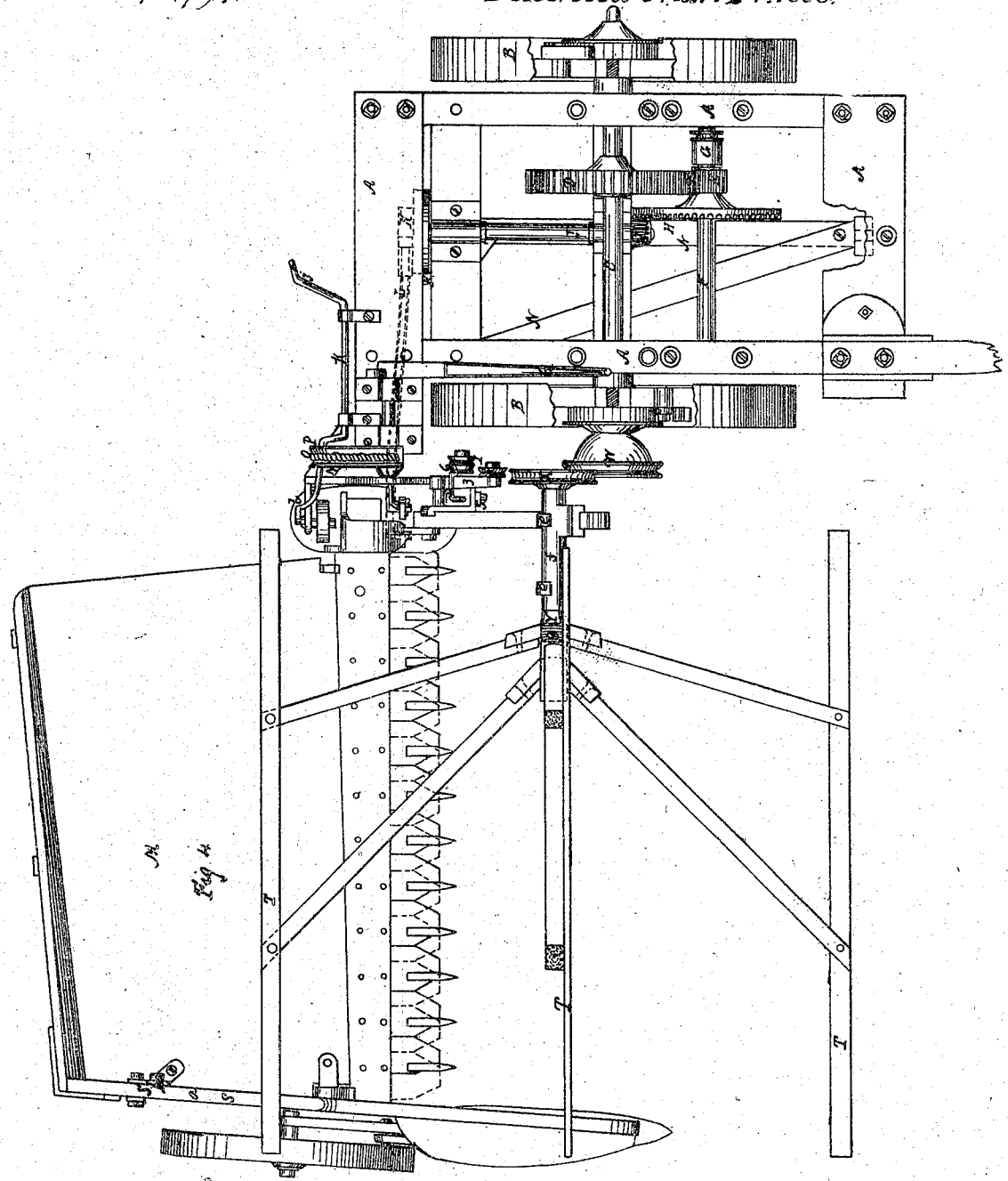
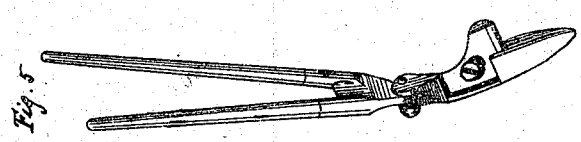

C. Russell and W. K. Miller.  3 Sheets
Sheet N? 3.
Harvester.
N? 75,797.   Patented Mar. 24, 1868.
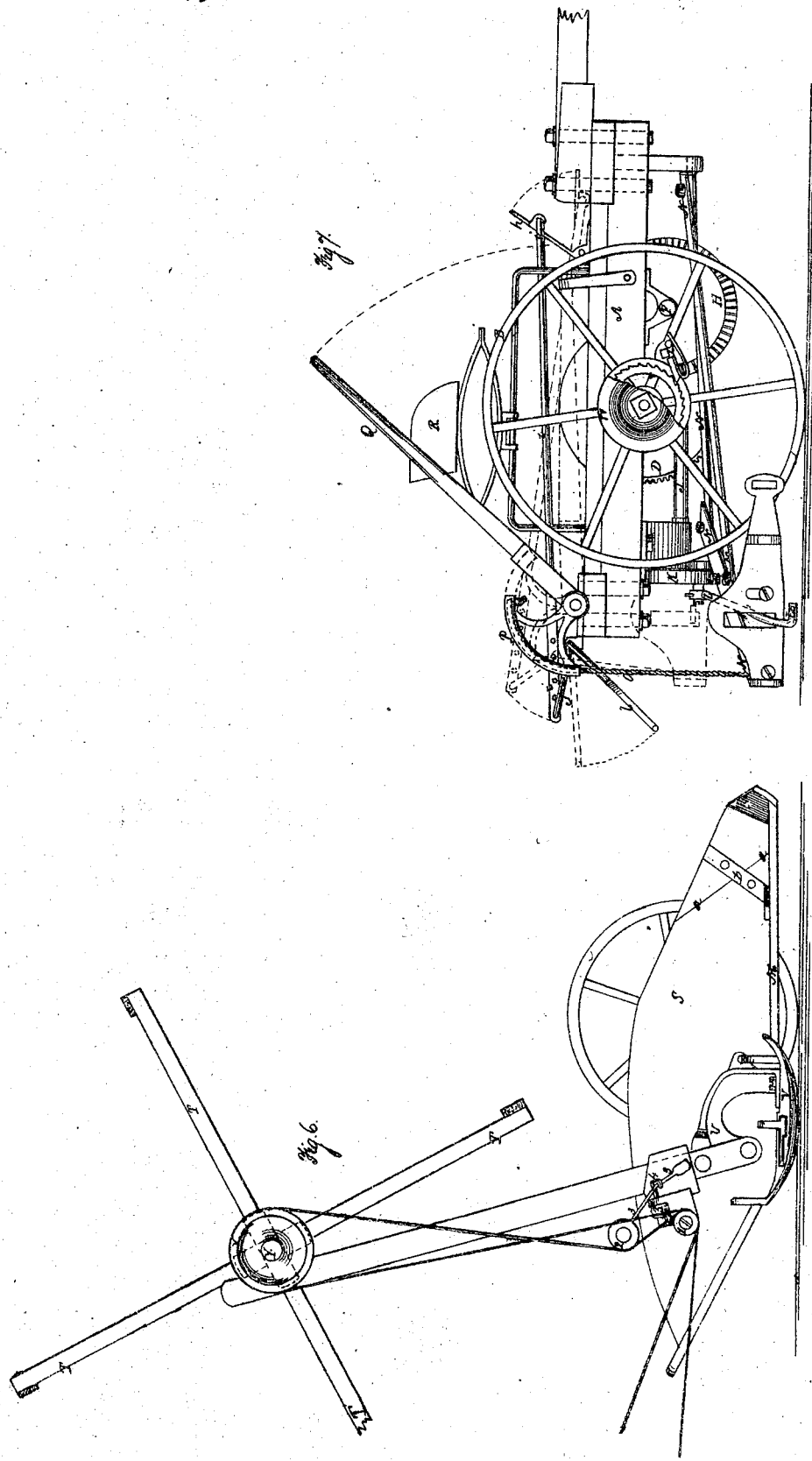

UNITED STATES PATENT OFFICE.

CLEMENT RUSSELL AND WILLIAM K. MILLER, OF MASSILLON, OHIO.

IMPROVEMENT IN HARVESTERS.

Specification forming part of Letters Patent No. 75,797, dated March 24, 1868.

*To all whom it may concern:*

Be it known that we, CLEMENT RUSSELL and WILLIAM K. MILLER, of Massillon, in the county of Stark and State of Ohio, have invented certain new and useful Improvements in Harvesting-Machines; and we do hereby declare the following to be a full, clear, and exact description of the same, reference being had to the accompanying drawings, making a part of this specification, in which—

Figure 1 represents a perspective view of the main frame, its carrying-wheels, the driving apparatus, and other appliances, the cutting apparatus and the parts more immediately connected with it being removed. Fig. 2 represents a perspective view of the platform, reel, and cutter, detached from the main frame and driving-gear, and as it appears when the machine is arranged for raking off the cut grain by hand. Fig. 3 represents a perspective view of the platform, reel, and cutter when arranged for dropping the cut grain in gavels upon the ground, under the control of the driver. Fig. 4 represents, on an enlarged scale, a top plan of the main frame, driving-gear, platform, cutter, and reel, connected together in working position. Fig. 5 represents, in perspective, the outside shoe and track-clearer used when cutting grass. Fig. 6 represents an end elevation of the platform or grain-table, reel-post, reel, and other connected parts. Fig. 7 represents a side elevation of the main frame, gearing, and other connected parts, taken from the platform side of said main frame.

Similar letters of reference, where they occur in the several separate figures, denote like parts of the machine in all of the drawings.

In cutting various crops, which, from their nature, become more or less tangled or blown or knocked down, it is found necessary to rake off some such by hand, while others may more advantageously be dropped by a simple mechanical movement, thrown into or out of action by the driver, and thus dispense with an extra hand on the machine.

The object and purpose of our invention are to so construct a harvesting-machine as that it may be readily changed or converted from a "hand-raking" to a "dropping" machine, or vice versa, as the condition of the crop to be cut may require or make most economical.

The nature of our invention consists, first, in so constructing a reaping-machine as that it may be readily converted, and used either as a hand-raker or as a dropper, as the fallen or tangled condition of the crop to be cut may require.

Our invention further consists in making the outside divider or end board of the platform in two parts, so as to admit of the changing of the machine from a hand to a drop delivery.

Our invention further consists in the combination of the pulley-lever and spring, for the purpose of taking up the slack of the chain that drives the reel.

To enable others skilled in the art to make and use our invention, we will proceed to describe the same with reference to the drawings.

The main frame A is supported on the usual carrying and driving wheels B B, which, by pawls and ratchets, turn with or independently of their axle C, in the well-known way. The primary cog-gear D is fast upon the main axle C, and works into and turns a pinion, E, upon a second shaft, F, in front of the axle, said pinion being loose upon its shaft, but, by means of a clutch, G, made fast thereto at pleasure. On the shaft F there is a bevel-gear, H, that works into a bevel-pinion, I, on the front end of a shaft, J, that extends rearward, its extreme rear end carrying the crank or wrist wheel K, to which the pitman L is connected, and by which the cutter or sickle is driven.

The platform M is connected to the main frame by the intermediate hinged bars or coupling-frame N, and a chain or rope, O, fastened to and working over the segment P, (which segment, in turn, is worked by a lever, Q,) and fastened to the coupling-frame, enables the operator, in his seat R, to raise and hold up or to let down the platform and cutting apparatus at pleasure. The end board S of the platform is made in two pieces or parts, *a* being the dividing-line between them; and across this line an iron bar, *b*, is placed, which strengthens the two parts when together, and admits of the after or rear portion being removed when the platform is removed to put on the dropper.

The reel T is supported upon a single reel-post, and is adjustable up and down upon said post. The reel-post is fastened at its heel or lower end to a curved arm, U, on the inner shoe V, and is adjustable forward or backward upon said arm. The reel is driven from a pulley, W, on the end of the axle C, or attached to the drive-wheel on the platform or grain side of the main frame, the chain that drives the reel being passed over, around, or against the several pulleys, as shown in Fig. 6, and as follows: The main driving-pulley W is seen in Figs. 1, 4, and 7. The chain or cord that drives the reel T from the pulley W is seen in Fig. 6. This chain, by preference, after passing around the pulley W, separates in its general direction, though eventually passes around the pulley X on the reel-shaft Y. One strand of the chain, after leaving the main pulley W, passes under a small guiding-pulley, 1, and partially around it; thence it passes around a second guiding and straining pulley, 2, that is placed upon a lever, 3, which lever is controlled by an arm, 4, which has a rubber spring-pad or cushion, 5, connected with it, to allow it to yield when strained, and to take up the slack of the chain when not strained. From the pulley 2 the chain passes to the rear of the pulley X, and thence over its front portion and down under a second guiding-pulley, 6, (see Figs. 2, 3, and 4,) alongside of the pulley 1, and on the same shaft with it.

When the machine is used as a hand-raker, and, as shown in Figs. 2 and 4, the raker is mounted upon the main frame, with his back to the team, and clears the platform in the usual well-known way. But when the dropper Z is to be used, then the platform is taken off, and the dropper occupies its position, as shown in Fig. 3. The holding-arm c is also put on by its forked tangs d, taking into loops or sockets e e on the saddle or support f of the reel-shaft, and the holder c is connected to the dropper Z by a connecting-rod, g, so that the holder and dropper shall rise and fall together, as will be explained.

On the main frame there is a hinged treadle or foot-lever, h, Fig. 7, to which one end of a rod, i, is attached, said rod extending rearward, and its rear end connected to the arm j of a crank-shaft, k, suitably supported on the main frame. On the end of the crank-shaft k most remote from the arm j there is another arm, l, which is connected to the arm m on the dropper, so that the driver upon his seat, and his foot upon the lever h, may, at pleasure, raise and hold up the dropper Z and holder c, or let them down, as the case may be.

When the dropper is raised up to catch and hold sufficient falling grain to form a gavel, the holding-arm c is also raised up, and far enough up to be out of the way of the falling grain. When sufficient has been accumulated to make a gavel, the driver releases the foot-lever, the dropper falls, and allows the grain to slide off onto the ground. In falling the arm c comes down into such a position as to hold the falling grain until the dropper is raised up to receive it, which it does, the holder swinging out from under it and allowing it to fall evenly upon the dropper.

The holder and dropper in nowise interfere with the working of the reel, the construction being such that each may do its special duty without interfering with that of the other devices, but all aiding to accomplish one object, viz., to gather in and deliver the grain when cut, in good condition, upon the ground.

There is a socket or bearing, n, on the outside board S, into which a journal or arm, o, on the platform, as also on the dropper Z, fits when either is applied, and in which bearing the dropper has one of its turning-supports, another, though open, bearing, r, being arranged at the other end of the finger or platform bar, to receive the other journal of the dropper Z, to admit of its rising and falling or hinged motions.

Thus either the platform or grain-table and hand-raking may be employed, or the dropper and an automatic delivery, under the control of the driver in his seat, may be used, as the tangled or fallen condition of the crop may require.

In hand-raking, the outside divider or board S is used complete, as in Figs. 2, 4, and 6; but when the platform is removed to apply the dropper, the after section or portion of said board is removed with the platform, and then it has the form as shown in Fig. 3.

When the machine is used for mowing grass, or crops not gathered in gavels, the platform, dropper, reel, and holder are removed, and also the outside supporting wheel and board, and a track-clearer, Fig. 5, added to the outside shoe.

Having thus fully described our invention, what we claim therein as new, and desire to secure by Letters Patent, is—

1. The construction and arrangement by which the platform and dropper are made interchangeable for hand-raking or mechanical dropping, under the control of the driver, substantially as described.

2. Making the end board S in two parts, so that the after part can be removed with or when the platform is removed, to adapt the machine for the application of the dropper, substantially as described.

3. The combination of the pulley 2, pulley-lever 3, holder 4, and rubber spring 5, or its equivalent, for taking up the slack in the reel-chain when said spring-pulley is arranged on the slack side of the chain, and is used in connection with a fixed pulley, 1, substantially as and for the purpose described.

CLEMENT RUSSELL.
W. K. MILLER.

Witnesses:
  Jos. K. Russell,
  T. B. George.